United States Patent [19]

Albrecht et al.

[11] Patent Number: 4,483,819

[45] Date of Patent: Nov. 20, 1984

[54] PRODUCTION OF HIGHLY CAPACITIVE AGGLOMERATED VALVE METAL POWDER AND VALVE METAL ELECTRODES FOR THE PRODUCTION OF ELECTROLYTIC CAPACITORS

[75] Inventors: Wolf-Wigand Albrecht, Bad Harzburg; Uwe Papp, Goslar, both of Fed. Rep. of Germany

[73] Assignee: Hermann C. Starck Berlin, Berlin, Fed. Rep. of Germany

[21] Appl. No.: 399,522

[22] Filed: Jul. 19, 1982

[30] Foreign Application Priority Data

Jul. 31, 1981 [DE] Fed. Rep. of Germany ....... 3130392

[51] Int. Cl.³ .......................... B22F 3/10; B22F 1/00; B22F 9/00
[52] U.S. Cl. .......................... 419/2; 419/30; 419/31; 419/44; 419/45; 75/0.5 BB; 75/84
[58] Field of Search .................. 419/2, 30, 31, 44, 45; 75/0.5 BB, 84

[56] References Cited

U.S. PATENT DOCUMENTS

| | | | |
|---|---|---|---|
| 2,537,068 | 1/1951 | Lilliendahl et al. | 419/31 X |
| 2,653,869 | 9/1953 | Gregory et al. | 419/30 X |
| 2,881,067 | 4/1959 | Hivert et al. | 75/84 X |
| 3,232,749 | 2/1966 | Yntema | 75/84 |
| 3,418,106 | 12/1968 | Pierret | 75/0.5 BB |
| 3,419,386 | 12/1968 | Holland et al. | 419/45 X |
| 3,499,753 | 3/1970 | Daendliker | 75/0.5 BB |
| 3,625,680 | 12/1971 | Asbury | 419/30 X |
| 3,627,520 | 12/1971 | Rogers | 419/2 |
| 3,647,415 | 3/1972 | Yano et al. | 75/84 X |
| 3,697,255 | 10/1972 | Baldwin et al. | 75/0.5 BB X |
| 3,859,086 | 1/1975 | Church et al. | 419/31 |
| 4,008,104 | 2/1977 | Nakamura et al. | 419/31 X |
| 4,017,302 | 4/1977 | Bates et al. | 75/0.5 BB |
| 4,059,442 | 11/1977 | Bernard | 419/2 |
| 4,231,790 | 11/1980 | Hahn et al. | 75/0.5 BB |

FOREIGN PATENT DOCUMENTS

| | | | |
|---|---|---|---|
| 543135 | 7/1957 | Canada | 419/30 |
| 619938 | 5/1961 | Canada | 419/31 |
| 7006 | 3/1975 | Japan | 75/0.5 BB |

Primary Examiner—Benjamin R. Padgett
Assistant Examiner—Matthew A. Thexton
Attorney, Agent, or Firm—Ladas & Parry

[57] ABSTRACT

A process for the production of agglomerated valve metal powder which comprises heating an admixture of a valve metal powder and a reducing agent in the presence of an inert gas or under high vacuum for a sufficient time and at a sufficiently elevated temperature that agglomeration of the valve metal powder occurs, and removing the reaction products of the reducing agent and the valve metal and any unreacted reducing agent from the agglomerated valve metal powder by subsequent reaction with an inorganic acid. The agglomerated powder can be sintered to prepare valve metal electrodes, e.g., anodes, which can also be prepared by direct sintering of the admixture of the metal powder and the reducing agent.

6 Claims, 2 Drawing Figures

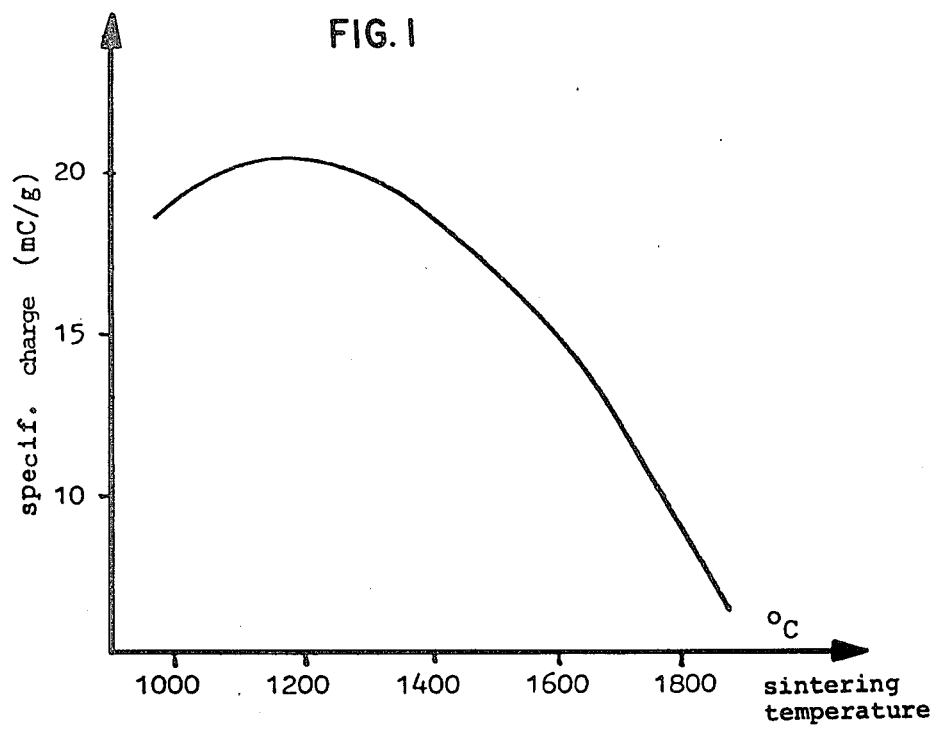
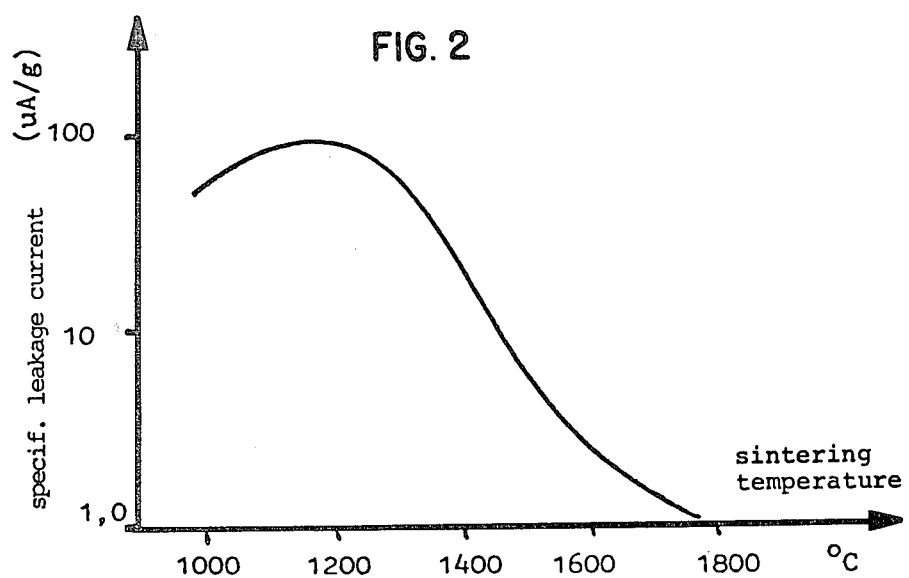

PRODUCTION OF HIGHLY CAPACITIVE AGGLOMERATED VALVE METAL POWDER AND VALVE METAL ELECTRODES FOR THE PRODUCTION OF ELECTROLYTIC CAPACITORS

BACKGROUND OF THE INVENTION

The present invention relates to the production of valve metal powders of maximum capacitance useful in the production of valve metal electrodes, for instance, tantalum anodes, for electrolytic capacitors having especially high specific electric charges, by the use of sinter metallurgy at a sintering temperature which is below that customary according to the prior art. At the same time the physical and technical properties with respect to powder-metallurgical processing as well as the chemical purity of tantalum metal powder are improved. The invention also relates to the production of valve metal anodes having a high specific electric charge and improved electrical properties.

Especially tantalum and alloys thereof, but in general metals of the groups IVb, Vb and VIb of the Periodic Table and alloys thereof, may be considered as valve metals (see also "Oxides and Oxide Films", Vol. 1, published by John W. Diggle, pages 94 and 95, 1972, Marcel Dekker, Inc., New York). The complicated relations of production, treatment and electrical properties of valve metal powders are discussed below in the indicated prior art references, which refer to the use of tantalum.

It is state of the art that tantalum metal powder is compressed to porous shaped bodies with or without a binder or is otherwise formed, and after the removal of the binder is subjected to a temperature treatment under high vacuum. The purpose of this sintering process is to increase the strength of the shaped bodies for further post-treatments and also, by means of degassing (evaporation) or diffusion processes, to remove impurities which by nature are present in the metal powder, or which have been introduced during the process of production, so as to provide satisfactory electrical properties in capacitor anodes produced therefrom. Impurities, especially those of a metallic nature, considerably impair the electrical properties of a tantalum capacitor, above all the electric strength and the leakage current, as, for example, is apparent from U.S. Pat. No. 3,418,106, column 1, lines 58ff.

Moreover, non-metallic impurities, especially oxygen, nitrogen, silicon, etc., lead, on the one hand, to brittle fracture of the sintered tantalum feed wire, and, on the other hand, affect the sintering nature of tantalum powder compacts in that said impurities, as barriers between the powder particles, hinder the diffusion processes determined by the sintering. As known from the literature (Eisenkolb, Thummler, *Grundlage der Pulvermetallurgie,* Berlin: 1963), such surface effects are generally of importance for sintering processes. An insufficient sintering of a tantalum anode causes intermetallic conduction bridges between individual particles of the sintered compact to be too weak and, therefore, to some extent totally to be destroyed or to become inoperative when forming the dielectric oxide film with the final result that the geometrically available total surface of the tantalum anode is not fully effective. Besides, the resistance component of the capacitor impedance therefore become very high. Moreover, the development of very thin metallic conduction bridges, i.e. conductors with very small cross-sections, leads to local overheating during the forming process in consequence of high electric current density and, hence, leads to the formation of crystalline oxide zones which, contrary to an amorphous oxide, have a high electric conducting capacity and therefore considerably degrade the capacitance properties of a valve metal anode.

In order to attain sufficient sintering of the tantalum anode, one has to apply high sintering temperatures which according to the state of the art are not below 1600° C., but mostly reach up to 2000° C. (see U.S. Pat. No. 3,892,310, 7 Table 1A and column 8, line 14 ff; U.S. Pat. No. 3,299,326).

Moreover, the high sintering temperatures bring about a purifying effect in that impurities evaporate under high vacuum, or diffuse from the metal surfaces into a metal grind (grate). In this way pure surfaces are formed which, on the one hand, permit the sintering process to take place and, on the other hand guarantee the formation of trouble-free oxide films (dielectrics) when forming the anodes. High sintering temperatures, however, have the disadvantageous side effect that the available "active" surface is reduced while the surface-rich fine particles of the tantalum powder sinter with one another so that the porosity and surface of the sintered anode are altogether reduced. This effect becomes evident, for example, when comparing specific charges (mC/g) under changed sintering conditions (1600°–1900° C.) in FIG. 4 of U.S. Pat. No. 3,829,310.

To reduce the aforementioned surface losses by sintering, valve metal powders according to the prior art are "agglomerated", i.e. subjected to thermal pre-treatment in vacuo. This thermal pre-treatment, as, for example, described in U.S. Pat. Nos. 3,418,106 and 4,017,302, leads to powder aggregates consisting of fine particles, the surface of which is very much preserved over a wide temperature range when sintering valve metal anodes. Besides, this thermal agglomeration has a positive influence on the most important parameters of the powder-metallurgical treatment of valve metal, such as flowability, compressive stability and porosity of the anodes.

It is also true that limits should be set to the fineness of the powder particles of the indicated metal powders because the valve metal surfaces form a passivating oxide film under the influence of atmospheric oxygen. For that reason the oxide content of fine-grained metal powders is naturally higher than that of coarser grain fractions. This is also particularly true for agglomerated tantalum powders which are sintered together from expecially fine individual particles. In this case there takes place an additional absorption of oxygen after the thermal agglomeration process and in consequence of a reactivation of the metal surface connected therewith. The temperature of the agglomeration process usually lies clearly below those temperatures which are applied in the sintering of anodes. Of course, when proceeding from the present state of the art, the temperature range is limited toward lower temperatures for both the agglomeration of powders and the sintering of anodes.

In principle, it would have been advantageous to sinter, e.g., tantalum, powder to porous capacitor anodes at as low temperatures as possible, i.e. within a temperature range below 1600° C., had it not been necessary to observe the heretofore pointed out pre-conditions according to the prior art.

THE DRAWINGS

FIG. 1 shows the relation between sintering temperature and specific charge of capacitor anodes for thermally produced tantalum powders.

The position of the maximum of the specific charge (mC/g) relative to the ordinate depends also on the grain size of the metal powder and naturally also on the forming voltage (potential), so the curve shown in FIG. 1 only has a schematic meaning. From the curve of FIG. 1 we may infer that the electrical properties of tantalum metal powders, especially the specific charge, could be considerably improved by reducing the final sintering temperature if at the same time it were not connected with an inadmissible increase of the leakage current ($\mu A/g$).

FIG. 2 shows the relationship between sintering temperature and specific leakage current of capacitor anodes.

Thus, the agglomeration temperatures within a range of from 1100° C. to 1500° C., which are usually cited in the literature, overlap a range which is aimed to be achieved as the final sintering temperature in the production of tantalum anodes (see FIG. 1) in order to obtain especially high specific charges.

It is the object of the present invention to substantially increase the capacitance effect (yield) of valve metal powders for capacitor purposes by improving them relative to purity, flow rate and compressibility so that it becomes possible to use lower sintering temperatures in the production of valve metal powders than is customary according to the prior art. Thereby, despite milder sintering conditions and an increased capacitance effect connected therewith, the leakage current and electric strength of the capacitors, obtained at higher sintering temperatures, should be retained. The same also applies to anodes.

It is a further object of the invention to define an agglomeration process which permits a lowering of the agglomeration temperature necessary according to the prior art so far that stable metal powder agglomerates are obtained even below the conventional temperatures, these metal powder agglomerates also being sufficiently pure in order to bring about the desired lowering of the final sintering temperatures, for example, for tantalum anodes, to a range below 1600° C.

SUMMARY OF THE INVENTION

In accordance with the present invention, valve metal powders for example, tantalum metal powders, as produced according to the prior art, are thermally "reactively" agglomerated by careful temperature treatment below 1200° C. under the influence of a reducing medium, i.e. they are subjected to a reducing medium during a careful temperature treatment under high vacuum or under inert gas. In accordance with the present invention there is provided a process for the production of agglomerated valve metal powder which comprises heating an admixture of a valve metal powder and a reducing agent in the presence of an inert gas or under high vacuum for a sufficient time and at a sufficiently elevated temperature that agglomeration of the valve metal powder occurs, and removing the reaction products of the reducing agent and the valve metal and any unreacted reducing agent from the agglomerated valve metal powder by subsequent reaction with an inorganic acid. As described in U.S. Pat. No. 3,418,106, agglomeration as used herein occurs when the individual powder particles physically adhere one to the other but the individual identity of the particles is not lost, such as would occur when such powders are sintered.

DETAILED DESCRIPTION OF THE INVENTION

The metal powder, which has been produced according to known processes, is carefully mixed with known reducing agents, for example, calcium, magnesium, aluminum, lithium, beryllium, etc., and heated in an inert gas furnace or high vacuum furnace to a temperature of from 800° to 1200° C. for several hours. Despite the relatively low temperature, the fine tantalum particles combine to form skeleton-like, mechanically stable agglomerates.

A prerequisite for this agglomeration is, as already mentioned, the presence of pure oxide-free metal surfaces which contact among themselves and sinter. A reducing agent which reacts in liquid and/or gaseous phase with surface impurities of tantalum particles and lays open new surfaces is used. The fact that in addition to the oxide film also other impurities of the tantalum metal powder are eliminated by means of the reducing agents is an unexpected side effect. This includes, for example, the by-products which have been brought in from the production process such as potassium, sodium, silicon, fluorine, etc.

Owing to the process according to the invention, it is generally possible appreciably to lower the temperatures for the agglomeration or sintering of valve metal powders. Thus, for example, for tantalum metal powders, the temperature of the initial sintering decreases from 37% to 27% of the melting temperature of tantalum in degrees centigrade. It was found that for niobium powder the corresponding values lie at about 40% or 32% of said melting temperature. The same also applies to other valve metal powders so that the process according to the invention can also be applied to such metals which are suitable for the production of anodes for electrolytic capacitors having advantageous electrical properties.

The reducing agent may be present in excess as long as it does not form an alloy with the valve metal, which is then unsuitable for capacitor purposes. If there does exist a danger of an alloy formation between a reducing metal and a valve metal, the stoichiometric amount of the reducing agent, which has been calculated from the impurity content of the metal, should be employed to the maximum.

A wet chemical aftertreatment of the metal powder, which is necessary after the agglomeration, follows in a known way with inorganic or mineral acids, preferably hydrochloric acid, in order thoroughly to wash the reaction products and any remaining reducing agent. A subsequent neutral washing is followed by a careful drying process.

To characterize the quality features, the valve metal powder produced according to the invention is chemically and physically tested over the prior art powders according to known and conventional methods. The following characteristic test data are compared:

chemical analyses; the determination of surfaces (BET); determination of an average particle size according to Fisher (air penetration method); bulk density determination (according to Scott); the mechanical strength of green compacts (load-rupture test); the electrical test of sintered anodes: specific charge (mC/g); relative leakage current ($\mu A/mC$).

The above described a thermal pre-treatment in the presence of an added reducing agent in an agglomeration process for valve metal powders in accordance with the invention facilitates subsequent powder-metallurgical treatment of the metal powders. However, in accordance with another aspect of the invention it is also possible to admix the reducing agent with the metal powder to produce capacitor anodes from valve metal powder by "reductive sintering" in a direct way, i.e. by omitting the agglomeration process. Of course, the remaining reducing agent and reaction products must then also be removed from the sintered compacts by being dissolved, for example, by means of mineral acid, before a subsequent treatment follows. Due to this treatment according to the invention one also achieves a noticeably higher specific charge of the valve metal anode; however, in comparison to the metal powder agglomerated according to the invention, the leakage current is a little greater so that in most cases one will prefer the additional route via the reductive agglomeration of the valve metal powder.

EXAMPLES Example 1

As a preferred example of applying the process according to the invention, there was carried out a test with a very fine-grained tantalum powder (see the properties in Table I); this fine-grained tantalum powder is usually separated by sieving during the production of electron-beam-melted tantalum powder according to U.S. Pat. No. 3,635,693. This fine metal powder is considered to be a waste product especially because of its high oxygen content and the undesired sintering activity; up to now it has been reintroduced into the electronbeam sintering process. 10 kg of this metal powder were mixed with 3 weight percent of calcium and heated at 1000° C. under argon atmosphere for 3 hours. The subsequent treatment of the reaction mass took place analogously as in the following Examples. There resulted 9.5 kg of a tantalum powder agglomerate comprising the properties included in Tables I and II, in relation to which electrical test data for tantalum powder had been compared in Table II (column la), said tantalum powder according to the prior art being known as agglomerated powder such as, for example, that produced according to U.S. Pat. No. 3,635,693.

Example 2

10 kg of tantalum metal powder which had been produced by means of a Na reduction and which properties are outlined in the following Table I (Table I, starting materials for tests 2-5) were intimately mixed with 2% =200 grams of magnesium metal powder. After entering the mixture into a retort, it was repeatedly evacuated and alternatingly flooded with argon. The charge was heated in the argon atmosphere to about 900° C. within a period of 30 minutes and kept at that temperature for about 3 hours. After cooling and discharging the slightly agglomerated powder cake, it was coarsely crushed and introduced into (semiconcentrated) hydrochloride acid. The formed magnesium compounds and remainders of the reduction metal dissolved under slight heating, whereupon pure tantalum powder was isolated from the reaction mass. The yield of dried tantalum metal powder was 9.95 kg. The test results are listed in Tables I and II.

Example 3

Test 2 was carried out with the same tantalum material; however, calcium was used instead of magnesium. The reducing agent amount was 3 percent by weight, based on the tantalum powder. A reaction temperature of 1000° C. was maintained for 3 hours. The following chemical aftertreatment was as in Example 2. The yield of tantalum powder was again over 99% of the charge.

Example 4

A further tantalum powder charge, as that used in Examples 2 and 3, was mixed with 0.5% of aluminum powder and, analogously as in Examples 1 and 2, heated at 1200° C. for 2 hours. The cooled agglomerated mass was passed in lumps over a jawbreaker and in that way pulverized. The crushed reaction product was pasted with 2 weight percent of concentrated sulfuric acid and for 1 hour heated to a temperature of about 120° C. in a drying chamber. The cooled cake was several times washed with hot water until a neutral reaction of the wash water was achieved. After drying, the pure tantalum powder weighed 9.9 kg.

Example 5

To illustrate another embodiment of the invention in which there is no agglomeration prior to sintering, the basic material of tests 2 to 4 was intensely mixed with 1 weight percent of Mg powder and compressed to tantalum anodes with cylindrical forms without the addition of binders (pressing aid). The "green" compacts having a weight of 0.4 g, a diameter of 4.6 mm and a "green density" of 5.5 g/cm$^3$ were sintered at 1200° C. (Table II column 5a) or at 1400° C. for 30 minutes and after cooling, they were subjected to a chemical aftertreatment in a warm, semiconcentrated hydrochloric acid solution for about 6 hours. The subsequent washing with water until a neutral reaction of the wash water was followed by a usual forming process under conditions of testing applicable to Table II. The test results with the tantalum powder according to the prior art as quoted in Table II, in columns 5b, should be applied as comparison data.

Comparison Tests on the Prior Art

To illustrate the advantages of the products according to the invention, tantalum powder according to the prior art was electrically tested under the same conditions as the products obtained according to the Examples of the invention. Column (A) in Table II designates the tantalum powder of the Na reduction process, as it was used as starting material in Examples 2 to 4, in a manner known, i.e. without any addition of reducing agents, agglomerated at 1400° C. under high vacuum and tested parallel to the test products of Examples 2 to 4. The comparison sample (b) for test 5 also consisted of the same starting sample as in Examples 2 to 4, however, it was not agglomerated, but subjected to a high vacuum degasification at 800° C.

Discussion of the Results

The chemical and physical mechanical data compiled in Table I show the advantageous effect of treating tantalum powder according to the invention. Surprisingly, the process according to the invention also leads to a considerable improvement of chemical purity, especially relative to the alkali content of the Na-reduced tantalum powder according to Examples 2 to 4; as expected, the oxygen content of the powder also drops. By determining and comparing the strength of the "green", i.e. unsintered tantalum anodes compressed from the test products, it appears that at unusually low pressed densities there is achieved a high mechanical strength of the formed bodies which is of great importance for large-scale production.

The expedient data of the test products with respect to the capacitor properties are shown in Table II with the results of the electrical tests. Even at unusually low sintering temperatures of 1500° C., the rates of electric strength and leakage current of the tantalum powder according to the invention are remarkable. The specific charge of the tantalum anode, produced according to the invention, is as an outstanding property on a so far unachieved level over the prior art.

This aspect is also of striking commercial importance for the production of tantalum capacitors since it allows a reduction of the tantalum content within the capacitor.

may be carried out a sintering at temperatures below 1600° C so as directly to produce sintered valve anodes. The thus obtained valve metal powders are excellent relative to flowability, compressive stability; they have a high specific charge at a low leakage current; the sintered valve anodes are distinguished by high purity and improved electrical properties.

We claim:

1. A process for the production of agglomerated tantalum powder, said tantalum being essentially pure and designed for use in an anode for an electrolytic capacitor with high specific charge and low leakage current, which comprises heating individual particles of said tantalum admixed with solid particles of a metallic reducing agent in the presence of an inert gas or under high vacuum at a temperature range of about 800° C. to about 1200° C. for a sufficient time that agglomeration of the tantalum powder occurs, and removing the reaction products of the reducing agent and the tantalum and any unreacted reducing agent from the agglomerated tantalum powder by subsequent reaction with an inorganic acid, said metallic reducing agent being selected from the group consisting of aluminum, calcium and magnesium.

TABLE I

CHEMICAL AND PHYSICAL PROPERTIES OF TANTALUM POWDER

| | Starting materials for tests | | Final products according to Examples | | | |
|---|---|---|---|---|---|---|
| | No. 1 | No. 2–5 | No. 1 | No. 2 | No. 3 | No. 4 |
| Chemical Analyses (data in ppm) | | | | | | |
| Al | <10 | <10 | <10 | <10 | <10 | 195 |
| Ca | <5 | <5 | <10 | <5 | <10 | <5 |
| K | <5 | 250 | <5 | 85 | 60 | 30 |
| Mg | <5 | <20 | <5 | <10 | <5 | <5 |
| Na | <5 | 350 | <5 | 120 | 55 | 30 |
| O | 3000 | 3200 | 800 | 700 | 1100 | 400 |
| Physical Properties | | | | | | |
| Particle size (according to FISHER)[1] ($\mu$m) | 1.0 | 1.0 | 1.8 | 1.2 | 1.1 | 1.7 |
| Bulk density (according to SCOTT) (g/cm$^3$) | 42 | 19.6 | 48 | 17.5 | 16.9 | 18.1 |
| Specific surface (BET) (m$^2$/g) | 0.4 | 0.85 | 0.27 | 0.75 | 0.65 | 0.58 |
| Strength[2] (N) | 13.3 | 11.1 | 113 | 125 | 151 | 93 |
| (at pressed density) (g/cm$^3$) | (7.0) | (5.0) | (7.0) | (5.0) | (5.0) | (5.0) |

[1]Measurement by means of air penetration method (Fisher Sub Sieve Sizer).
[2]Measurement of maximum load of a cylindrical compact (without a binder) with 6.75 mm ∅; Weight: 2 grams in test 1; 1 gram in tests 2–4.

TABLE II

ELECTRICAL TEST OF THE TEST PRODUCTS OF EXAMPLES 1 TO 5 AND THEIR REFERENCE SAMPLES ACCORDING TO THE PRIOR ART

| Constant Conditions: | |
|---|---|
| Weight of the green anode | 0.4 g |
| Pressed densities | test 1: 6.5 g/cm$^3$; tests 2–5: 5.0 g/cm$^3$ |
| Sintering temperature | test 1–4: 1500° C.; tests 5a and 5b: 1200° or 1400° C. |
| Sintering time: | 30 minutes |
| Formation: electrolyte | 0.01% H$_3$PO$_4$ test electrolyte: 10% H$_3$PO$_4$ |
| final voltage | 70 volt |
| current density | 35 mA/g |
| bath temperature | 90° C. |
| forming time | 120 minutes |

| | Test | Comparison (Pr. art) | Tests on the red. aggl. | | | Comp. (Pr. art) | Reductive 1200° C. | | sintering at 1400° C. | |
|---|---|---|---|---|---|---|---|---|---|---|
| Test Readings: | No. 1 | 1a | 2 | 3 | 4 | A | 5a | 5b | 5a | 5b |
| Specific charge (mC/g) | 14.0 | (7.5) | 23.5 | 21.6 | 19.2 | (16.0) | 32.5 | (17.5) | 27.2 | (16.8) |
| rel. leakage current ($\mu$A/mC) | 0.27 | (0.30) | 0.17 | 0.17 | 0.80 | (0.2) | 1.5 | (1.3) | 0.41 | (0.61) |
| breakdown voltage (volt) | 170 | (170) | 145 | 150 | 132 | (140) | 110 | (110) | 115 | (110) |

(Data in parenthesis: comparison data on the prior art)

In the case of a process for the production of pure agglomerated valve metal powders for electrolytic capacitors, a thermal agglomeration is carried out at comparatively low temperatures of from 600° to 1600° C. in the presence of reducing agents such as Al, Be, Ca and Mg. The reducing agents may also be added to valve metal powders according to the prior art, and then there 2. A process according to claim 1, wherein the reducing agent is used in the amount of 5% by weight based on the tantalum powder.

3. A sintered anode for electrolytic capacitors produced by sintering agglomerated tantalum powder obtained by the process according to claim 1.

4. A sintered anode according to claim 3, wherein the sintering temperature is not greater than about 1500° C.

5. A sintered anode according to claim 3, wherein the sintering temperature is below 1600° C.

6. A sintered anode according to claim 5, wherein the sintering temperature is between about 1400° and about 1600° C.

* * * * *